(12) United States Patent
Pignon

(10) Patent No.: US 8,567,180 B2
(45) Date of Patent: Oct. 29, 2013

(54) REFORMER UNIT

(75) Inventor: John Frederick Pignon, Benson (GB)

(73) Assignee: Johnson Matthey Public Limited Company, London (GB)

( * ) Notice: Subject to any disclaimer, the term of this patent is extended or adjusted under 35 U.S.C. 154(b) by 228 days.

(21) Appl. No.: 13/112,612

(22) Filed: May 20, 2011

(65) Prior Publication Data

US 2012/0117965 A1    May 17, 2012

(30) Foreign Application Priority Data

Nov. 11, 2010   (GB) .................................. 1019027.0

(51) Int. Cl.
*F01N 3/00*    (2006.01)

(52) U.S. Cl.
USPC .................. 60/286; 60/288; 60/295; 60/303; 48/197 R; 48/198.3

(58) Field of Classification Search
USPC ........... 60/274, 286, 287, 288, 295, 297, 300, 60/301, 303; 48/197 R, 198.1, 198.3
See application file for complete search history.

(56) References Cited

U.S. PATENT DOCUMENTS

| | | | |
|---|---|---|---|
| 4,211,075 A | | 7/1980 | Ludecke et al. |
| 7,334,400 B2 | * | 2/2008 | Yan et al. .......................... 60/286 |
| 7,386,977 B2 | * | 6/2008 | Ancimer et al. ................. 60/286 |
| 7,700,070 B2 | * | 4/2010 | Finkbeiner et al. ............ 423/650 |
| 8,037,674 B2 | * | 10/2011 | Kupe et al. ....................... 60/286 |
| 8,209,960 B2 | * | 7/2012 | Shamis et al. .................... 60/286 |

| | | | |
|---|---|---|---|
| 2004/0187483 A1 | | 9/2004 | Dalla Betta et al. |
| 2007/0033929 A1 | | 2/2007 | Telford et al. |
| 2010/0300382 A1 | | 12/2010 | Yahagi et al. |

FOREIGN PATENT DOCUMENTS

| | | |
|---|---|---|
| EP | 1484103 A1 | 12/2004 |
| EP | 1 640 580 A1 | 3/2006 |
| EP | 1640580 A1 | 3/2006 |
| EP | 1 857 648 A1 | 11/2007 |
| EP | 1857648 A1 | 11/2007 |
| EP | 2239432 A1 | 10/2010 |
| GB | 2462798 A | 2/2010 |
| JP | 2009-236016 A | 10/2009 |

(Continued)

OTHER PUBLICATIONS

International Search Report for corresponding PCT Patent Application No. PCT/GB2011/052206 dated Feb. 13, 2012.

(Continued)

*Primary Examiner* — Binh Q Tran
(74) *Attorney, Agent, or Firm* — Kevin M. Carroll

(57) ABSTRACT

A diesel engine having an inlet side and an outlet side provided with at least one inlet valve and one outlet valve per cylinder, comprises a reformer catalyst unit comprising a catalyst located downstream of the outlet valve(s) and located such that a proportion of the hot exhaust passes through the catalyst while the remainder of the hot exhaust passes to a turbocharger and/or to exhaust gas aftertreatment, wherein the catalyst unit is provided with diesel fuel supply means, preferably in the form of a diesel fuel injector, such that diesel fuel may be injected to provide heat to the reformer catalyst to raise it to an effective reforming temperature. The output from the reformer unit may be fed to the inlet side of the engine, and/or may be admixed with the remainder of the exhaust gases prior to catalytic aftertreatment. Improvements in emission control are possible.

7 Claims, 1 Drawing Sheet

(56) References Cited

FOREIGN PATENT DOCUMENTS

| JP | 2009236016 A | 10/2009 |
| JP | 2009-257217 A | 11/2009 |
| JP | 2009257217 A | 11/2009 |
| WO | 2007037652 A1 | 4/2007 |

OTHER PUBLICATIONS

GB Search Report for corresponding Great Britain Patent Application No. GB1019027.0 dated Mar. 14, 2011.
Tsolakis et al., "Application of Exhaust Gas Fuel Reforming in Compression ignition Engines Fueled by Diesel and Biodiesel Fuel Mixtures," *Energy & Fuels*, 2003, vol. 17, pp. 1464-1473.

Burch et al., "An Investigation of Promoter Effects in the Reduction of NO By $H_2$ under Lean-Burn Conditions," *Journal of Catalysis*, 2002, vol. 208, pp. 435-447.
Tsolakis et al., Combustion Characteristics and Exhaust Gas Emissions of a Diesel Engine Supplied with Reformed EGR, *SAE Technical Paper Series*, Paper No. 2005-01-2087, Copyright © 2005 SAE International.
Tsolakis et al., "Sensitivity of process efficiency to reaction routes in exhaust-gas reforming of diesel fuel," *Chemical Engineering Journal*, 2006, vol. 117, pp. 131-136.
British Search Report dated Mar. 11, 2011, from British Patent Application No. 1019027.0.

\* cited by examiner

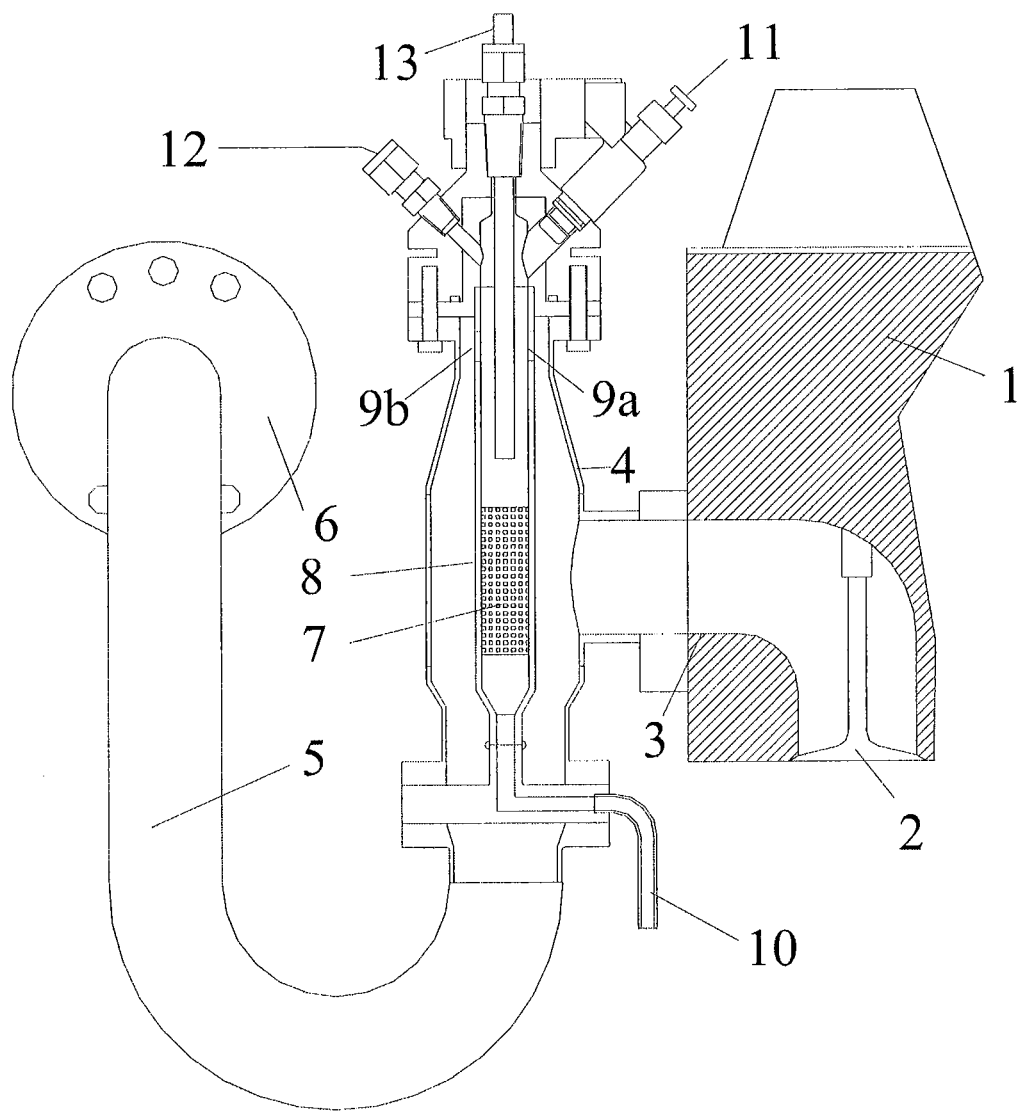

REFORMER UNIT

CROSS-REFERENCE TO RELATED APPLICATIONS

This application claims priority of British Patent Application No. 1019027.0, filed Nov. 11, 2010, the disclosure of which is incorporated herein by reference in its entirety for all purposes.

FIELD OF THE INVENTION

The present invention concerns an improved reformer unit, more especially a design of a practical reformer capable of being built to a scale such that it can be incorporated in a vehicle.

BACKGROUND OF THE INVENTION

The reforming of hydrocarbons is a well-known process which is practised on an industrial scale. It has been suggested that diesel fuel may be reformed to form hydrogen, and that the hydrogen may be added to diesel fuel or biodiesel to directly reduce NOx and smoke (particulates) emissions from a diesel engine. As an alternative, or in addition, the hydrogen present in reformate may assist the catalytic aftertreatment of the lean (that is, oxygen-rich) exhaust gases from diesel engines, especially in the reduction of NOx to $N_2$. See Energy & Fuels 2003, 17, 1464-1473 and Journal of Catalysis 208, 435-447 (2002). Other theoretical reviews of the possibilities of this technology include SAE 2005-01-2087 A. Tsolakis et al and Chemical Engineering Journal 117 (2006) 131-136. Our GB 2462798 also contemplates the use of an exhaust gas reformer in a light duty diesel engine.

SUMMARY OF THE INVENTION

At present, however, the applicants are not aware that any practical reformer suitable for use with a diesel engine has been constructed or even designed. In particular, the parameters for design for a reformer for a diesel vehicle are very challenging. Primarily, the heat available, because of the relatively low temperatures of exhaust gases in both light duty and heavy duty diesel engines, does not allow the endothermic steam reforming reaction to be used. This would be favoured over oxidative reforming because of the higher proportion of hydrogen in the product gases. Substantially all new diesel engines being constructed are turbocharged, which can also complicate the incorporation of any workable design of reformer.

Accordingly, the present invention provides a diesel engine having an inlet side and an outlet side provided with at least one inlet valve and one outlet valve per cylinder, comprising a reformer catalyst unit comprising a catalyst located downstream of the outlet valve(s) and located such that a proportion of the hot exhaust passes through the catalyst whilst the remainder of the hot exhaust passes to a turbocharger and/or to exhaust gas aftertreatment, and additionally the catalyst unit is provided with diesel fuel supply means, preferably in the form of a diesel fuel injector, such that diesel fuel may be injected to provide heat to the reformer catalyst to raise it to an effective reforming temperature.

BRIEF DESCRIPTION OF THE FIGURES

The present invention will now be described with reference to the accompanying non-limiting drawings, in which:

FIG. 1 is a cross-section of one embodiment of a reformer unit according to the invention, shown connected to a diesel engine cylinder head (part shown only) and connected to a turbocharger (shown schematically).

DETAILED DESCRIPTION OF THE INVENTION

The reformer catalyst is not itself critical to the present invention. It is preferred that the reformer operates mainly as a steam reformer, utilising the water vapour carried within the exhaust gases from the engine. The catalyst may be, for example, Pt and/or Pd on ceria. The form of the catalyst is preferably in the form of a deposit on a conventional honeycomb substrate, desirably a metal honeycomb. If the diesel engine is to be used as a stationary power source, for example to power a generator, an alternative shell and tube design, where the catalyst is in the form of pellets, may be considered. In general, catalysts for use on vehicles are required to be extremely robust, and therefore pellets and the like which can be prone to abrasion caused by vibration, are not preferred.

The reformer catalyst unit may be designed to be attached to the cylinder head of an existing engine, for example within the exhaust manifold. Alternatively, the cylinder head itself may be redesigned to incorporate the catalyst unit with its fuel supply means (injector).

The diesel fuel supply means is conveniently essentially identical to those used to inject fuel into the engine. Desirably, the supply means is associated with control means, for example connected to the electronic engine management system, with inputs including catalyst temperature and/or temperature of the gases entering and leaving the reformer unit.

As has been specified, only a proportion of the exhaust gases pass through the reformer. This will provide sufficient hydrogen (and CO) to facilitate downstream catalytic exhaust gas aftertreatment, whilst minimising the usage of diesel fuel supplied to the reformer unit. It is thought that a fixed proportion will be suitable in most cases, although a variable proportion, adjustable by a valve, may be included for other situations. Initial designs use a low proportion, under 10% by vol, to pass through the catalyst. Most desirably, about 1-2% of the total exhaust gases are passed through the reformer catalyst.

The skilled designer will be able to design a variety of reformer units for use in the present invention without departing from the inventive concept. He will, of course, design the unit to use the maximum amount of heat available from the exhaust gases.

If the reformate product from the reformer is supplied to assist in the light-off and operation of a selective catalytic reduction ("SCR") catalyst downstream of the turbocharger, the invention offers the possibility of increasing the choice of the SCR catalyst.

A diesel engine cylinder head 1 has an exhaust valve 2 connected to an exhaust port 3. Attached to the cylinder head is a modified exhaust manifold 4. The manifold 4 is connected by an exhaust pipe 5 to a standard turbocharger 6.

The modified exhaust manifold contains a reformer catalyst in the form of a coated metal flow-through honeycomb, 7, mounted within a housing 8. The housing has exhaust entry points, 9a, 9b etc, such that a proportion of the exhaust gas from the exhaust port enters the housing and flows through the catalyst, as shown in the drawing. The catalyst 7 is mounted centrally with respect to the exhaust port, so that it is exposed to the hottest exhaust gases, which flow around it and provide initial heating. The housing 8 has an outlet pipe 10, which is taken out of the exhaust pipe and may be fedback into the engine as high calorific value fuel and/or as an addition to the post-turbocharger gases fed to an SCR catalyst. Post turbocharger, energy has been extracted from the exhaust, and the gases have been cooled significantly.

Mounted on the modified manifold, and connecting with the catalyst is a diesel fuel injector 11. This supplies fuel which combusts on the catalyst with the residual oxygen present in the exhaust gases. A thermocouple entry point 12 is shown, for thermocouples located within the catalyst (not shown), and the illustrated embodiment also incorporates a start-up heater 13, conveniently a conventional glow-plug.

The embodiment shown has been built and operated on a static test diesel engine with good results.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A diesel engine having an inlet side and an outlet side provided with at least one inlet valve and one outlet valve per cylinder, comprising a reformer catalyst unit comprising a catalyst located downstream of the outlet valve(s) and located such that a proportion of hot exhaust passes through the catalyst whilst the remainder of the hot exhaust passes to a turbocharger, exhaust gas aftertreatment, or both, wherein the catalyst unit is provided with diesel fuel supply means such that diesel fuel may be injected to provide heat to the reformer catalyst to raise it to an effective reforming temperature, wherein the catalyst unit is located within an exhaust manifold or a cylinder head.

2. An engine according to claim 1, wherein the catalyst is of annular form, and is located within an annular housing permitting the hot exhaust gas to flow over internal and external surfaces of the housing.

3. An engine according to claim 1, wherein the catalyst is a deposit of catalytic material on a metal flow-through honeycomb support.

4. An engine according to claim 1, wherein less than 10% by vol of the exhaust gases from the engine pass through the catalyst.

5. An engine according to claim 4, wherein the quantity of the exhaust gases passing through the catalyst is approximately 1-2%.

6. An engine according to claim 1, provided with a connection from the reformer catalyst to the inlet side of the engine, to some point in the exhaust line upstream of a catalytic aftertreatment means, or to both.

7. An engine according to claim wherein the diesel fuel supply means is a diesel fuel injector.

* * * * *